United States Patent
Jayabalan

(10) Patent No.: US 12,450,988 B2
(45) Date of Patent: Oct. 21, 2025

(54) ATM FRAUD DETECTION SYSTEM AND METHODS THEREOF

(71) Applicant: IntelliData360, Inc., Sunnyvale, CA (US)

(72) Inventor: Pranav Jayabalan, Sunnyvale, CA (US)

( * ) Notice: Subject to any disclaimer, the term of this patent is extended or adjusted under 35 U.S.C. 154(b) by 444 days.

(21) Appl. No.: 18/132,387

(22) Filed: Apr. 8, 2023

(65) Prior Publication Data

US 2023/0245534 A1    Aug. 3, 2023

Related U.S. Application Data

(63) Continuation-in-part of application No. 17/500,867, filed on Oct. 13, 2021, now abandoned.

(51) Int. Cl.
| | |
|---|---|
| *G07F 19/00* | (2006.01) |
| *G06Q 20/34* | (2012.01) |
| *G07D 11/225* | (2019.01) |

(52) U.S. Cl.
CPC ......... *G07F 19/207* (2013.01); *G06Q 20/352* (2013.01); *G07D 11/225* (2019.01); *G07F 19/211* (2013.01)

(58) Field of Classification Search
CPC ........................ G06Q 20/1085; G07D 11/225; G07F 19/211; G07F 19/209; G07F 19/207; G07F 19/2055
USPC ....................................................... 235/379
See application file for complete search history.

(56) References Cited

U.S. PATENT DOCUMENTS

| | | | |
|---|---|---|---|
| 6,508,397 B1 * | 1/2003 | Do | G07F 19/20 902/1 |
| 7,183,915 B2 | 2/2007 | Bartholf | |
| 7,784,680 B1 * | 8/2010 | Mason | G07F 19/207 358/1.14 |
| 7,934,643 B1 * | 5/2011 | Crews | G07F 19/205 902/8 |
| 8,556,168 B1 * | 10/2013 | Lewis | G07F 19/20 235/379 |
| 8,763,897 B1 | 7/2014 | Enright | |
| 10,607,456 B1 | 3/2020 | Benkreira | |
| 10,769,896 B1 * | 9/2020 | Farivar | G06V 40/28 |
| 11,100,764 B1 * | 8/2021 | Dant | G07F 19/207 |
| 11,182,794 B1 | 11/2021 | Aument | |
| 11,301,821 B2 | 4/2022 | Jan | |
| 11,410,194 B1 | 8/2022 | Goetz | |
| 11,682,270 B2 * | 6/2023 | Smith | G07F 19/201 235/494 |
| 2002/0000913 A1 | 1/2002 | Hamamoto | |

(Continued)

*Primary Examiner* — Daniel I Walsh
(74) *Attorney, Agent, or Firm* — Rangarjan Sourirajan; RAJAN LAW OFFICE, LLC

(57) ABSTRACT

An ATM fraud detection system having a plurality of vibration sensors to detect vibration of one or more of an ATM cash dispenser, card reader, cash rejection bin, and/or cash tray. The system further having NFC sensor to detect persistent presence of wireless signal near an ATM machine. The system also includes a plurality of reed switch sensors to detect tampering of cash door, network cable-model interface, network cable-computer interface, hard disk drive-computer interface and/or ATM keyboard cable-computer interface. A micro controller is programmed to detect fraudulent ATM activity such as jackpotting, transaction reversal, shimming, skimming, cash trapping or internal theft.

15 Claims, 11 Drawing Sheets

(56) References Cited

U.S. PATENT DOCUMENTS

| | | | |
|---|---|---|---|
| 2005/0094564 A1 | 5/2005 | Huang | |
| 2006/0169764 A1* | 8/2006 | Ross | G07F 19/20 |
| | | | 235/375 |
| 2007/0040023 A1 | 2/2007 | Ruggirello | |
| 2008/0251578 A1 | 10/2008 | Jansing | |
| 2012/0223134 A1 | 9/2012 | Smith | |
| 2014/0374477 A1 | 12/2014 | Korala | |
| 2018/0300724 A1 | 10/2018 | Vokes | |
| 2019/0279468 A1 | 9/2019 | Kishi | |
| 2020/0027026 A1 | 1/2020 | Cook | |
| 2020/0388116 A1 | 12/2020 | Satanal | |
| 2021/0081917 A1 | 3/2021 | Blackford | |
| 2021/0090044 A1 | 3/2021 | Edwards | |
| 2021/0304571 A1* | 9/2021 | Sanghvi | G08B 15/00 |
| 2021/0342797 A1* | 11/2021 | Albero | G06Q 20/18 |
| 2021/0365906 A1* | 11/2021 | Gupta | G06F 1/1698 |
| 2021/0365908 A1 | 11/2021 | Gupta | |
| 2022/0020252 A1* | 1/2022 | Fumanelli | G07F 19/205 |
| 2022/0108591 A1* | 4/2022 | Jayabalan | G07F 19/207 |
| 2022/0139175 A1* | 5/2022 | Slensker | G07F 19/209 |
| | | | 726/34 |
| 2022/0319283 A1 | 10/2022 | Misra | |

\* cited by examiner

ATM FRAUD DETECTION SYSTEM AND METHODS THEREOF

CROSS REFERENCE TO RELATED APPLICATIONS

This continuation-in-part patent application claims the benefit of U.S. application Ser. No. 17/500,867 titled "ATM Frauds Detection by Machine Learning System: SentryWare and SentryManager," filed on Oct. 13, 2021, the disclosure of which is hereby incorporated by reference in its entirety.

BACKGROUND OF THE INVENTION

The inventive concepts relate to the field of fraud detection system and, in particular, to an Automated Teller Machine (ATM) fraud detection system. More particularly, the inventive concepts relate to an ATM fraud detection system and methods thereof.

Financial institutions around the world lose billions due to ATM fraud. The ATM frauds maybe: (1) Skimming wherein fraudsters attach a wireless device to the ATM card reader opening, which reads the personal and card information on the magnetic stripe of the cards that are used at the ATM; (2) Shimming wherein fraudsters insert a thin electronic device inside the ATM card reader so that the data read and written to the EMV (Europa y, Mastercard, and Visa) chip on the ATM/Credit card can be accessed by the fraudsters. This enables them to duplicate the ATM/Credit card with the EMV data; (3) Jackpotting wherein fraudsters either connect a black box to the cash dispenser of the ATM, access the ATM network by tapping the network cable, or installing a virus onto the ATM computer. This enables the fraudsters to access the cash dispenser of the ATM which is activated to dispense cash on demand; (4) Internal Service Person Theft in which an ATM service representative either steals directly from the cash dispenser or alters the BIOS/Hard Disk image (OS) in the ATM; (5) ATM Theft in which the ATM itself may be stolen by breaking open the ATM by placing explosives onto the ATM and get away with the cash dispenser; (6) Network cable, Keyboard, Hard. Disk, NFC Card Reader and other ATM Computer component Tampering in which fraudsters physically tamper with the ATM by attaching a keyboard or accessing the network cable to install a virus software or replace the hard disk on the ATM computer with a virus or tamper with any other component of the ATM computer; (7) Transaction Reversal in which a fraudster initiates a cash dispense transaction and in the middle of the cash dispensing process, the fraudster terminates the transaction by pulling out the ATM card but accesses the cash before the cash is returned to the reject bin of the cash dispenser; (8) Cash Trapping in which a fraudster attaches a device to the ATM cash dispenser and diverts any cash dispensed into that device. This results in a customer not receiving the money as the cash gets trapped into the device and the fraudster retrieves the money after the customer is gone.

Current systems and solutions in the market place do not target ATM frauds in a wholesome manner. For example, a software may prevent users from modifying the BIOS of an ATM computer. However, a fraudster may change the motherboard of the ATM computer with a different BIOS and then install malwares in the ATM computer. In this instance, existing systems are unable to detect the change in BIOS and a compromised ATM until all the cash from the ATM machine has been emptied. Alternatively, fraudsters may withdraw cash over a long period of time and existing systems may be unable to detect such a malware.

The need exists for an ATM fraud detection system that can automatically detect one or more of ATM frauds such as skimming, shimming, jackpotting etc. There is a further need for a system that will generate labeled datasets to infer data to detect ATM fraud activity. There is a need for an adaptive system that can learn, validate, or relearn ATM activity with changing fraudulent activities. Finally, there is a need for an out-of-band solution that can function independent of ATM power and network.

SUMMARY OF THE INVENTION

The inventive concepts overcome the disadvantages of the prior art and fulfills the needs noted above by providing an ATM fraud detection system.

An inventive concept includes an ATM fraud detection system, the ATM fraud detection system having an ATM machine, the ATM machine having a cash tray, a cash rejection bin, a cash dispenser, a cash door, a card reader, an NFC card reader, an ATM computer, an ATM network hub, an ATM hard disk drive, a keyboard, and a network cable. It further includes a plurality of vibration sensors, at least one of these sensors is arranged adjacent or in the vicinity of the cash tray, the cash rejection bin, the cash dispenser, the cash door, the card reader, and the surface of the opening of the card reader.

It further includes a micro controller. The microcontroller is communicatively linked to each of the plurality of vibration sensors, and the micro controller configured to read and/or write data from the plurality of vibration sensors. The network cable communicatively links the ATM network hub to the micro controller.

The ATM fraud detection system further includes a plurality of electric/magnetic switches, a first one of these switches is arranged adjacent or in the vicinity of a hard disk drive of the ATM computer, a second one of these switches is arranged adjacent or in the vicinity of the keyboard, and a third one of these switches is arranged adjacent or in the vicinity of the network cable. Each of the plurality of electric/magnetic switches is communicatively linked to the micro controller, and the micro controller configured to read data from the plurality of electric/magnetic switches.

The ATM fraud detection system also includes a power clamp meter. The power clamp meter is wrapped around a power cable supplying power to the cash dispenser. The power clamp meter is communicatively linked to the micro controller, and the micro controller configured to read data from the power clamp meter.

The ATM fraud detection system also includes an NFC card reader sensor. The NFC card reader sensor is arranged adjacent or in the vicinity of the NFC card reader. The NFC card reader sensor is communicatively linked to the micro controller, and the micro controller configured to read and/or write data from the NFC card reader sensor.

An inventive concept also includes a method of detecting jackpotting using the ATM fraud detection system. The method includes the steps of reading the voltage of the cash dispenser vibration sensor, reading the network packets to and from the ATM machine, comparing the readings from the cash dispenser vibration sensor and the network packets against baseline data patterns, determining validity of a transaction, and determining a response based on validity of the transaction.

The step of determining validity of a transaction further includes the step of identifying a jackpotting fraud based on activation of the cash dispenser vibration sensor without a pre-network data pattern for cash withdrawal authorization. The step of determining the response includes the steps of providing alert messages or generating a ticket in a third-party ticketing application.

An inventive concept also includes a method of detecting transaction reversal fraud using the ATM fraud detection system. The method includes the steps of reading the voltage of the cash rejection bin vibration sensor, reading the network packets to and from the ATM machine, comparing the readings from the cash rejection bin vibration sensor and the network packets against baseline data patterns, determining validity of a transaction, and determining a response based on validity of the transaction.

The step of determining validity of a transaction further includes the step of identifying a transaction reversal fraud based on identification of a transaction reversal request from network data pattern without a corresponding activation of the cash rejection bin vibration sensor. The step of determining the response includes the steps of providing alert messages or generating a ticket in a third-party ticketing application.

An inventive concept also includes a method of detecting shimming using the ATM fraud detection system. The method includes the steps of reading the voltage of the card reader vibration sensor, reading the network packets to and from the ATM machine, comparing the readings from the card reader vibration sensor, and the network packets against baseline data patterns, determining validity of a transaction, and determining a response based on validity of the transaction.

The step of determining validity of a transaction further includes the step of identifying a shimming fraud based on activation of the card reader vibration sensor without a network data pattern for card authorization/authentication. The step of determining the response includes the steps of providing alert messages or generating a ticket in a third-party ticketing application.

An inventive concept includes a method of detecting skimming using the ATM fraud detection system. The method includes the steps of reading the voltage of the card reader opening surface vibration sensor, reading the network packets to and from the ATM machine, comparing the readings from the card reader opening surface vibration sensor, and the network packets against baseline data patterns, determining validity of a transaction, and determining a response based on validity of the transaction.

The step of determining validity of a transaction further includes the step of identifying a skimming fraud based on activation of the card reader opening surface vibration sensor without a network data pattern for card authorization/authentication. The step of determining the response includes the steps of providing alert messages or generating a ticket in a third-party ticketing application.

An inventive concept includes a method of detecting cash trapping using the ATM fraud detection system. The method includes the steps of reading the voltage of the cash dispenser vibration sensor, reading the network packets to and from the ATM machine, comparing the readings from the cash dispenser vibration sensor, cash door switch sensor and the network packets against baseline data patterns, determining validity of a transaction, and determining a response based on validity of the transaction.

The step of determining validity of a transaction further includes the step of identifying a cash trapping fraud based on activation of the cash dispenser vibration sensor along with a network data pattern for cash dispensation without an activation of the cash door switch sensor. The step of determining the response includes the steps of providing alert messages or generating a ticket in a third-party ticketing application.

An inventive concept includes a method of detecting internal theft fraud using the ATM fraud detection system. The method includes the steps of reading the voltage of the cash tray vibration sensor, identifying valid ATM service request from the service log for ATM management and identifying valid network data pattern for authentication of service personnel, comparing the readings from the cash tray vibration sensor, the network packets against baseline data patterns and the service log, determining validity of an ATM activity, and determining a response based on validity of the ATM activity.

The step of determining validity of an ATM activity further includes the step of identifying an internal theft fraud based on activation of the cash tray vibration sensor without a service request for a service member to access the ATM machine to load/unload the cash tray. The step of determining the response includes the steps of providing alert messages or generating a ticket in a third-party ticketing application.

The inventive concept also includes a system for implementing the above methods in a computer system. In this system, the computer comprises a computer-readable storage medium in which the software implementing the above methods are stored and executed. The system includes, among others, a network controller that is communicatively linked to a network such as a Local Area Network (LAN), Wide Area Network (WAN), Internet, or the like.

Further, the inventive concept includes a system for implementing the above methods using a cloud computing architecture. The software implementing the methods is stored in an application server in the cloud, and a plurality of image devices and plurality of ATM fraud detection systems are communicatively linked to the cloud.

Other features and advantages of the inventive concepts will become apparent from the following description of the invention, which refers to the accompanying drawings.

DETAILED DESCRIPTION OF THE PREFERRED EMBODIMENTS

Disclosed embodiments relate to an ATM fraud detection system and methods of using the same.

The terminology used herein is for the purpose of describing particular embodiments only and is not intended to limit the invention. As used herein, the singular terms "a," "an," and "the" are intended to include the plural forms as well, unless the context clearly indicates otherwise.

The term "cloud computing" is defined as a model for enabling convenient, on-demand network access to a shared pool of configurable computing resources (such as networks, servers, storage, applications, and services) that can be rapidly provisioned and released with minimal management effort or service provider interaction. Also, any system providing access via the Internet to processing power, storage, software or other computing services, often via a web browser.

The term "computer-readable storage medium" or "computer-readable storage media" is intended to include any medium or media capable of storing data in a machine-readable format that can be accessed by a sensing device and capable of converting the data into binary format. Examples include, but not limited to, floppy disk, hard drive, zip disk, tape drive, CD-ROM, CD-R, CD-RW, DVD-ROM, DVD-RW, blu-ray disc, USB flash drive, RAM, ROM, solid state drive, memory stick, multimedia card, CompactFlash, holographic data storage devices, minidisc, semiconductor memory or storage device, or the like.

The term "machine learning" or "ML" is defined as a subfield of artificial intelligence which is broadly defined as the capability of a machine to imitate intelligent human behavior, or the field of study that gives computers the ability to learn without explicitly being programmed.

The term "supervised learning" is defined as a subcategory of machine learning and artificial intelligence and is a machine learning approach defined by its use of labeled datasets to train or supervise algorithms to classify data or predict outcomes accurately. Supervised learning methods may be classification or regression.

The term "unsupervised learning" is defined as a machine learning approach that uses machine learning algorithms to analyze and cluster unlabeled datasets and these algorithms discover hidden patterns in data without the need for human intervention. Unsupervised learning models may use learning techniques such as clustering, association or dimensionality reduction.

The term "labeled dataset" is defined as a designation for pieces of data that have been tagged with one or more labels identifying certain properties or characteristics, or classifications or contained objects.

The term "deep learning" is defined as a type of machine learning based on artificial neural networks in which multiple layers of processing are used to extract progressively higher level features from data.

Figure 1:
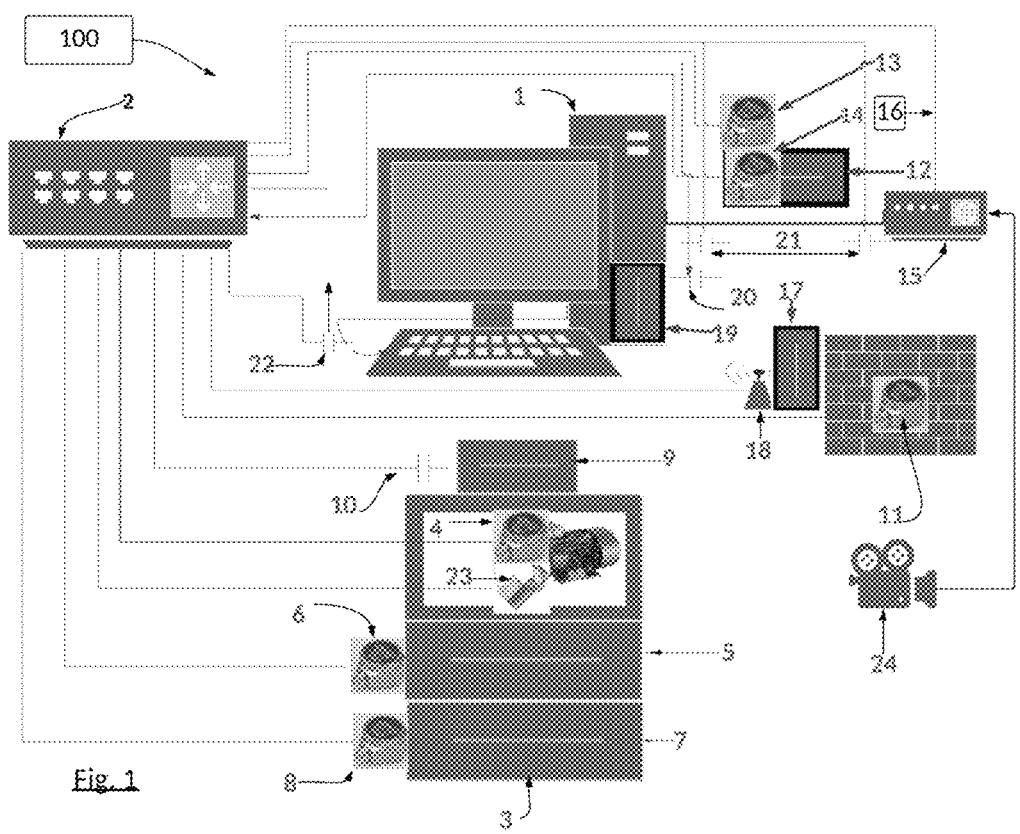
FIG. 1 illustrates a schematic diagram of an ATM fraud detection system in accordance with an embodiment of the inventive concepts.

Referring now to the drawings, where like elements are designated by like reference numerals, FIG. 1 illustrates an ATM fraud detection system 100 in accordance with an embodiment. The system 100 may include ATM machine having cash dispenser 3, cash dispenser vibration sensor 4, cash tray 7, cash tray vibration sensor 8, cash rejection bin 5, cash rejection bin vibration sensor 6, cash door 9, cash door switch sensor 10, card reader 12, card reader vibration sensor 13, card reader opening surface vibration sensor 14, NFC card reader 17, NFC card reader sensor 18, ATM computer 1, ATM hub/network switch 15, ATM hard disk drive 19, and micro controller 2 designated as "Sentry-Ware." The system 100 also includes hard disk drive switch sensor 20, network cable switch sensor 21, keyboard switch sensor 22, ATM surface/wall vibration sensor 11, cash dispenser power clamp meter 23. Network cable 16 may communicatively link the ATM hub/network switch 15 to the micro controller 2. Cash tray 7 and cash rejection bin 5 maybe any container within the ATM machine configured to store currency notes. The various sensors 4, 6, 8, 10, 11, 13, 14, 18, 20, 21, 22 and meter 23 may be communicatively linked to the micro controller 2. FIG. 1 illustrates certain components but it is understood that system 100 may include additional or multiple components connected in various ways.

Card reader 12 may be any device configured to detect a card within the ATM of system 100 and may include a card sensor (not shown) and/or a Near Field Communication (NFC) reader 17, the card reader 12 configured to read and authenticate a user to access their account information. The system 100 may also include an imaging device 24, for example, a digital camera, video recorder, or the like to capture and/or record images and/or videos of a user who may use the ATM machine of system 100. The imaging device 24 may be communicatively linked to the ATM network hub/switch 15.

System 100 may include a visual display device (not shown), for example, touch screen display, flat panel display, or computer/video monitor to display a graphical user interface to a user and an input device to enable a user to input information. The input device may be, for example, a keyboard (shown in FIG. 1), touch screen interface (not shown), screen buttons (not shown), or the like.

TABLE 1

ATM Fraud Detection System of the Inventive Concept

| | |
|---|---|
| Micro Controller: | Raspberry Pi4, Intel Edison, Arduino |
| Vibration Sensors: | YQBOOM 35 mm Piezo Disc Transducer; Interlogix DV1221A-1; Piezo Pickup Transducer 6.35 mm |
| Contact/Reed Switch: | Contact Switch/Reed Switch DC 5 V/12 V/24 V 0.5 A Type (NC/NO/COM) Range (5-20 mm) |
| Power Clamp Meter: | Seeed Technology's SCT013 60 A |
| NFC Sensor: | NXP's PN7120 IC |

The various vibration sensors may be any device configured to detect vibration of one or more components of the system 100 due to an ATM activity and preferably are YQBOOM 35 mm Piezo Disc Transducer, Interlogix DV1221A-1, or Piezo Pickup Transducer 6.35 mm. The cash dispenser vibration sensor 4 may be any device configured to detect vibration of the cash dispenser 3 when cash is dispensed by the ATM machine and the cash dispenser vibration sensor 4 may be mounted on or arranged adjacent to or in the vicinity of cash dispenser 3. The cash tray vibration sensor 8 may be any device configured to detect vibration of the cash tray 7 and may be mounted on or arranged adjacent to or in the vicinity of cash tray 7. The cash rejection bin vibration sensor 6 may be any device configured to detect vibration of the cash rejection bin 5 and may be mounted on or arranged adjacent to or in the vicinity of cash rejection bin 5. The cash door switch sensor 10 may be any device configured to detect opening of the cash door 9 and may be mounted on or arranged adjacent to or in the vicinity of cash door 9. The card reader vibration sensor 13 may be any device configured to detect vibration of the card reader 12 and may be mounted on or arranged adjacent to or in the vicinity of card reader 12. The card reader opening surface vibration sensor 14 may be any device configured to detect vibration of the surface of the card reader opening and may be arranged adjacent to or in the vicinity of card reader opening. The NFC card reader sensor 18 may be any device configured to detect wireless signal to the NFC card reader 17 and may be arranged adjacent to or in the vicinity of the NFC card reader 17. The ATM wall/surface sensor 11 may be any device configured to detect vibration of the ATM wall/surface and may be mounted on the ATM wall/surface.

The hard disk drive switch sensor 20 may be any electric/magnetic switch configured to detect tampering of the hard disk of the ATM computer 1 and may be mounted on or arranged adjacent to or in the vicinity of the hard disk of the ATM computer 1. The network cable switch sensor 21 may be any electric/magnetic switch configured to detect tampering network cable connecting the modem and ATM computer 1 and may be mounted on or arranged adjacent to or in the vicinity of the ATM computer 1 and modem. The keyboard switch sensor 22 may be any electric/magnetic switch configured to detect tampering of the keyboard cable of the ATM machine and may be mounted on or arranged adjacent to or in the vicinity of the USB port where the keyboard is plugged. Preferably, the switch sensors 20, 21, 22 are Contact Switch/Reed Switch DC 5V/12V/24V 0.5 A Type (NC/NO/COM) Range (5-20 mm).

The cash dispenser power clamp meter 23 may be any electrical power clamp meter configured to measure the electrical power used by the cash dispenser 3. The cash dispenser power clamp meter 23 may be wrapped around the power cable supplying power to the cash dispenser 23. Preferably, the cash dispenser power clamp meter 23 is Seeed Technology's SCT013 60A.

The NFC card reader sensor 18 may be any NFC sensor configured to detect wireless communication between the NFC card reader 17 and any other device. The NFC card reader sensor 18 may be arranged adjacent to or in the vicinity of the NFC card reader 17. Preferably, the NFC card reader sensor 18 is NXP's PN7120 IC.

Micro controller 2 designated as "SentryWare" may include one or more processing devices such as a microprocessor, RISC processor, ASIC, etc., and associated processing circuitry. Preferably, micro controller 2 is Raspberry Pi4, Intel Edison, or Arduino. Micro controller 2 (i.e., SentryWare) may be communicatively linked to the various vibration sensors, switch sensors and/or power clamp meter to receive data for analysis. For example, voltage signals from the various vibration sensors are recorded or stored in the SentryWare. Baseline vibration data is analyzed by SentryWare to identify the non-activity of a component of the ATM machine such as the cash dispenser 3, cash tray 7 or cash rejection bin 5.

In another inventive concept, system 100 may include wireless signal detectors to detect persistent presence of wireless cameras (which may be used in conjunction with a skimming/shimming device) or presence of spying/hacking wireless devices including, but not limited to, cellphones near the ATM machine.

Figure 2:
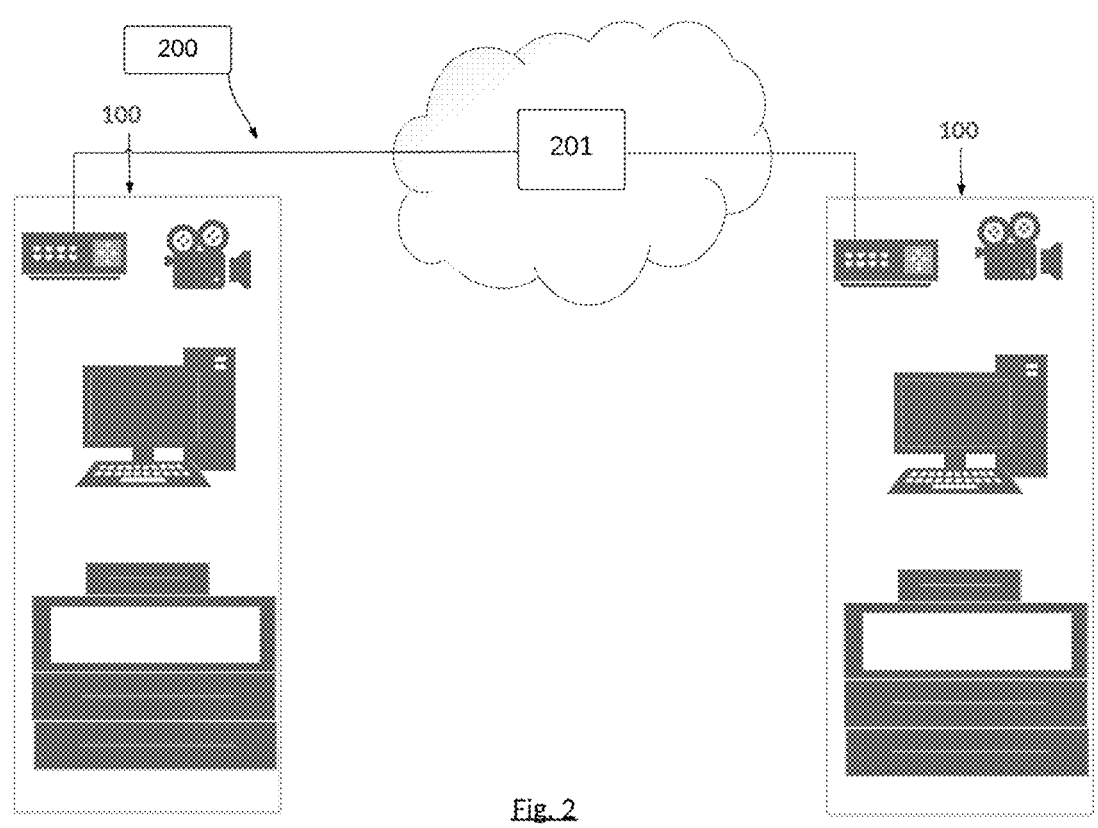
FIG. 2 is a schematic diagram of the ATM fraud detection system in which methods according to various embodiments of the inventive concepts may be implemented.

FIG. 2 illustrates a cloud computing architecture 200 in which methods according to various embodiments of the inventive concepts may be implemented. Referring to FIG. 2, a plurality of ATM fraud detection system 100 and a plurality of image devices 24 may be communicatively linked to the cloud. An ATM fraud detection application, SentryManager 201, may be hosted on the cloud.

The cloud may be a private cloud, community cloud, combined cloud, hybrid cloud, or any other cloud model. The cloud may have services such as Software as a Service (SaaS), which eliminates the need to install and run an application on a client machine; Platform as a Service (PaaS), which facilitates a computing platform in the cloud; and Infrastructure as a Service (IaaS), which delivers computer infrastructure such as servers, storage and network equipment on the cloud. The cloud may be hosted by any of the public cloud services such as Amazon AWS, Microsoft Azure, Google Cloud, IBM Cloud, Oracle Cloud, or the like.

Alternatively, the network connecting the plurality of ATM fraud detection system 100 may be a Local Area Network (LAN), Wide Area Network (WAN), Internet, an intranet system, an extranet system, or the like. The network may have one of several topologies including, but not limited to, point-to-point, bus, star, ring, tree, mesh and hybrid. The plurality of image devices 24, the plurality of ATM fraud detection system 100 and the network may be communicatively linked using 100Base-T Ethernet, digital subscriber line (DSL), integrated service digital network (ISDN), DS lines, dedicated T1/T3 lines, fiber-optic cables, satellite dish, wireless, or the like.

SentryManager 201 is a software application that may be written in a procedural or object-oriented language. In a preferred embodiment, SentryManager 201 is an interactive web application that stores, retrieves, processes, and displays various sensor parameters including, but not limited to, network and sensor data patterns, ATM model based sensor configuration. The SentryManager 25 also stores operational periodical status of all SentryWares including information on any faulty sensors, fraud alerts for the ATM, etc.

The SentryManager 201 may use various machine learning and modeling strategies to learn and predict changes network and sensor data patterns as well as human activity from video data. The SentryManager 201 may use machine learning tools and models, such as Caffe, OpenPose and Detectron 2 to better predict human pose and activity from video data.

The inventive concept further includes providing analytic and interactive visualization capabilities on user devices to aid the user. The user interface may be available on user devices across various platforms such as Android, Apple, Windows or the like. The user interface preferably allows the user to remotely monitor and/or reconfigure the SentryWare 2.

The user interface may have the option to link or not to link the user interface on user devices with the cloud repository. If the user chooses not to link the user interface on user devices with cloud services, the user may choose to use Bluetooth, WIFI or RF module (radio frequency module) for communication between the user device and the SentryManager 201.

SentryWare 2 may be configured as an out-of-band machine learning solution (i.e., an application that is not integrated with applications within the ATM computer). Preferably, ATM computer maintains a computer log files called electronic journals that log user activity, timestamp, and ATM activity such as a user inserting a card, authenticating the card, depositing/withdrawing cash, and the ATM machine completing transaction of dispensing cash and/or dispensing card. SentryWare 2 may implement supervised learning or alternatively, SentryManager 201 may also implement supervised learning. In this process, labeled datasets are created using data collected from the plurality of sensors and data from the electronic journal.

Advantages of an out-of-band solution such as the SentryWare 2 are as follows: (1) SentryWare 2 may be powered by a Lithium-ion battery and therefore detect ATM fraudulent activity even in instances where the fraudsters may power down the ATM system and/or disable the network; (2) SentryWare 2 may be configured to communicate using pager technology and thus function independent of the ATM network if needed; and (3) SentryWare 2 may detect a jackpot malware in the ATM computer that may go undetected by an antivirus software installed in the ATM computer. Jackpotting may occur with a fraudster physically breaking open an ATM or through malware attacks on the ATM, i.e., network hacking. Both modes of such jackpotting may be detected by analyzing the sensor patterns and the network data patterns; (4) multi-mode detection of fraud reduces the susceptibility of the detection system to failures. For example, if the cash dispenser vibration sensor fails, the power clamp meter may act as a substitute for the cash dispenser vibration sensor thus providing a fool-proof system. Similarly, video data processing and journal log entry comparison may augment the sensor and network data based fraud detection and enhance the reliability of the fraud detection system; and (5) identifying network activity based on network data pattern is unique to the current solution and wouldn't be possible as an in-band solution (i.e., by having additional software code in existing applications deployed in the ATM computer).

SentryManager 201 may be deployed with deep learning software with frameworks such as PyTorch, TensorFlow, or JAX and models like OpenPose and Detectron 2 and may be communicatively linked to the image device 24. Deep learning image models like Detectron 2 and OpenPose for computer vision may be used to process video data from the image device 24 to assess human activities near the ATM.

To begin with, vibration data from plurality of sensors is collected from dusk to dawn by SentryWare 2 and stored in it. After verifying against entries in the journals, data pattern is learned using ML methodologies. In the learning mode, datasets are automatically correlated to the ATM activity based on the time stamp on the journal log for each activity. For example, if a "card read" activity is logged at time t in the journal, sensor data will be extracted around time t from the data collected from a plurality of sensors to create a labeled dataset for "card reading." A few of these datasets can then be used for supervised learning and validation for "Card Reading" activity.

Similarly, SentryWare 2 collects data on network packets from the ATM network via a network tap and stores the network packets that are sent or received by the ATM machine. In the learning mode, the network datasets are automatically correlated to the ATM activity based on the time stamp on the journal log for each activity. For example, if a "card read" activity is logged at time t in the journal, network data will be extracted around time t from the data collected from the ATM network to create a labeled dataset for "card reading." A few of these datasets can then be used for supervised learning and validation for "Card Reading" activity.

The network data pattern would vary when the ATM authenticates the card user with the switch than when the ATM requests authorization to dispense cash. Machine learning is done on these different network data patterns like card authorization, cash withdrawal request, deposit, transaction reversal etc. by matching with journal log entry for the corresponding ATM activity. During inference (i.e., after learning is done), network data patterns conforming to the above ATM activities are identified and cross-checked with the journal log or the sensor data. If there is a mismatch, then a corresponding fraudulent alert is generated. Any network data pattern that does not conform to any of the learned pattern may be detected as a network hack. Thus, the network data pattern analysis would help identify network hacking of an ATM and such a functionality is not currently available with existing anti-virus or firewall software applications.

In this manner, labeled datasets are created in the learning mode for various ATM activities such as card reading, cash dispensation, cash tray loading/removal, transaction reversal, etc. A few of these datasets can then be used for supervised learning and validation for the ATM activity. Once machine-learnt, the machine-learnt model may then be used to infer the current sensor data to detect the ATM activity. If the sensor data does not correlate or if they are not in compliance with journal log, other bank ATM data or the network data, a fraudulent alert is generated.

For example, if a transaction reversal network data pattern is detected but a corresponding sensor data for cash rejection bin where the transaction reversal cash is returned is not activated, then it will be construed as a transaction reversal fraud. Additionally, any network data pattern that does not conform to any of the learned patterns will be construed as network hacking. Generic network solutions like Firewall and Intrusion Detection System/Intrusion Prevention System are built on a set of generic information related to network and application vulnerabilities but these network solutions are ineffective if a rogue operator introduces a disembodied virus into the ATM computer. SentryWare 2 monitors the allowed, non-generic network data patterns for the ATM applications which cannot be monitored by generic firewall/IPS devices. Thus, SentryWare 2 may detect any unwarranted network communication from the ATM machine (in case a spyware is installed in the ATM machine through corrupt means) or to the ATM machine (in case the ATM network has been compromised). Additionally, based on network packet analysis, the SentryWare 2 may detect any hacking/rerouting of the ATM network.

Similarly, in the learning mode, image device 24 data are automatically correlated to the ATM activity based on the time stamp on the journal log for each activity. For example, the "cash dispense" entry in the journal log at time t is used to extract video data around time t, and from this data set, deep learning Models are learnt to identify "cash withdrawal" activity. Once the deep learning model is learnt, subsequent video data is inferred to identify cash withdrawal. If the deep-learnt model detects cash withdrawal activity and there is no corresponding journal/switch/bank log entry for cash withdrawal, an ATM fraud alarm is raised. This ATM fraudulent activity would also be corroborated with the cash dispenser sensor data.

Subsequent to generating the labeled datasets, the SentryWare 2 may be configured to validate and relearn each of the ATM activity independently and automatically. The need for self-learning is essential because the network environment (such as dial-up, wireless, wired etc.) and sensor environment (such as vibration level, sensor preload, temperature and environmental effect on sensor) may be unique to each deployment and therefore, difficult to pre-program out-of-the-factory or as a one-time installation procedure. The baseline and active datasets are learned based on the ATM electronic journals. Subsequent to learning, self-learned data models may be used to detect ATM activity and cross-checked against electronic journal, sensor data, or network data. If there is a significant number of false positives or true negatives (i.e., when the SentryWare 2 detection does not match the electronic journals/bank records), SentryWare 2 may automatically trigger relearning. Relearning may happen due to a change in the ATM deployment (for example, redeployment of an ATM machine to a different location may affect sensor response) or a change in the ATM components (for example, a change in the material used to make a cash tray that may alter sensor response).

Unlike existing systems and solutions, SentryWare 2 would detect malwares irrespective of whether the malware is being run from within the ATM computer or not. SentryWare 2 would detect a fraud so long as there is no valid ATM network communication corresponding to an ATM activity and there is invalid sensor activation(s). In instances where SentryWare 2 is tampered with or physically removed, SentryManager 201 would detect the absence of SentryWare 2 at the given ATM location as SentryWare 2 periodically updates its status to the SentryManager 201.

Similarly, system 100 is also capable of detecting removal, tampering and/or dislodging of the plurality of vibration and/or switch sensors. The plurality of vibration and/or switch sensors are pre-loaded with stress resulting in a baseline data having a residual voltage. When one or more of the plurality of vibration and/or switch sensor is removed, tampered or dislodged, the residual voltage reading would be zero, thereby triggering a sensor fault alert. Thus, tampering any component of system 100 would be identified by SentryWare 2 or SentryManager 201 including the time of occurrence of such an event.

Additionally, system 100 is capable of identifying ATM frauds even when an ATM is not accessed through removal of an ATM top cover. SentryWare 2 and SentryManager 201, either alone or in combination, provide a solution that is both rogue service member proof and remote network hacking proof. Generic network solutions such as firewall/IDS and antivirus software protect against known vulnerabilities and are not customized to provide ATM solutions.

In an inventive concept, machine learning model may use neural networks, for example, RNN (Recurrent Neural Networks) to process time series data of the labeled datasets (i.e., data identified as having unique characteristics, for example, data belonging to when a card reader sensor is activated) and to generate a model referred to as learnt-model. To this learnt-model, live data from the various sensors and network of system 100 is then provided as an input to this learnt-model and it generates the probability that the live data is identical to the labeled dataset. This matching of live data to the labeled dataset by the learnt-model may be referred as inference of the data. A threshold probability cut-off value is chosen for identification of the data and this threshold value may be a predetermined value or a user-specified value.

SentryWare 2 uses multiple modes of identifying an ATM activity. Hence, SentryWare 2 has the capability to detect whether the learnt-model is generating False Negatives (FN) or False Positives (FP). False Positives may occur due to a faulty sensor, changing environment, or software upgrades to the ATM computer. For example, an upgrade to the software in the ATM computer may modify the way in which the ATM computer communicates with the switch to authorize cash dispense. This would alter the network data patterns for cash dispense. The journal log data and sensor data from the card reader and cash dispenser would confirm that the card was read by the ATM machine and cash was dispensed. However, the network data pattern analyzer would generate a False Positive alert that the ATM network has been hacked as the network data pattern wouldn't match the learnt-model. SentryManager 201 may confirm that the cash withdrawal transaction is valid pursuant to the journal log entries and the sensor data and would record the network hacking event as a False Positive. In instances where False Positives may be confirmed, SentryWare 2 may relearn the network data pattern after False Positives reach a predetermined or a user-specified threshold value, Thus, thresholds may be set for relearning the machine learning model based on the number of False Positives. In relearning, new labeled datasets are created (using the learning process specified earlier) and the machine learning model is updated.

SentryManager 201 may include a ticketing application that may suggest possible ways to resolve False Positives or False Negatives. If a False Positive is generated during a cash dispense activity as described earlier, the ticketing system of the SentryManager 201 may suggest network relearning as a way to resolve the False Positive issue.

An example of a change in environment would be the replacement of a cash dispenser in an existing ATM machine with a new energy efficient cash dispenser module. Because the power consumed by the new cash dispenser will be less than the replaced cash dispenser, the power clamp meter data pattern that has been learnt for higher power consumption will not detect cash dispense activity for the new cash dispenser module. Thus, there will be False Negative reporting by the power clamp data pattern. However, the journal log, cash dispenser sensor data pattern and network data pattern would confirm that the cash dispense activity is valid. The non-reporting of the power clamp meter (False Negative) will be identified by the SentryManager 201. Upon reaching a predetermined or user-specified threshold value of False Negatives, power clamp meter data relearning will be automatically triggered.

Similar process may be implemented for failure of the sensors. Thus, for single component failures, SentryManager 201 or SentryWare 2 may automatically relearn the machine learning model after the faulty sensor is replaced. This relearning capability allows the use of piezo sensors that are mass produced and hence lower in price but may not have same quantitative characteristics. For example, mounting a sensor at a location proximal to the source of vibration (e.g., motor of the cash dispenser) and the method of mounting (such as a bolt and nut or attachment to the motor surface) determine the performance of the sensor. But trying to perfect mounting the sensor or the method of mounting may be an expensive solution. On the other hand, SentryWare 2 may work with flexible mounting, for e.g., gluing the sensor in the vicinity of the motor of the cash dispenser as the sensitivity of the sensor is learned by SentryWare 2 subsequent to deployment of the sensor. While the learning mode of the machine learning model and the use of the learnt-model for detecting ATM frauds is described for SentryWare 2, it should be understood that the same may be implemented using SentryManager 201.

Figure 3A:
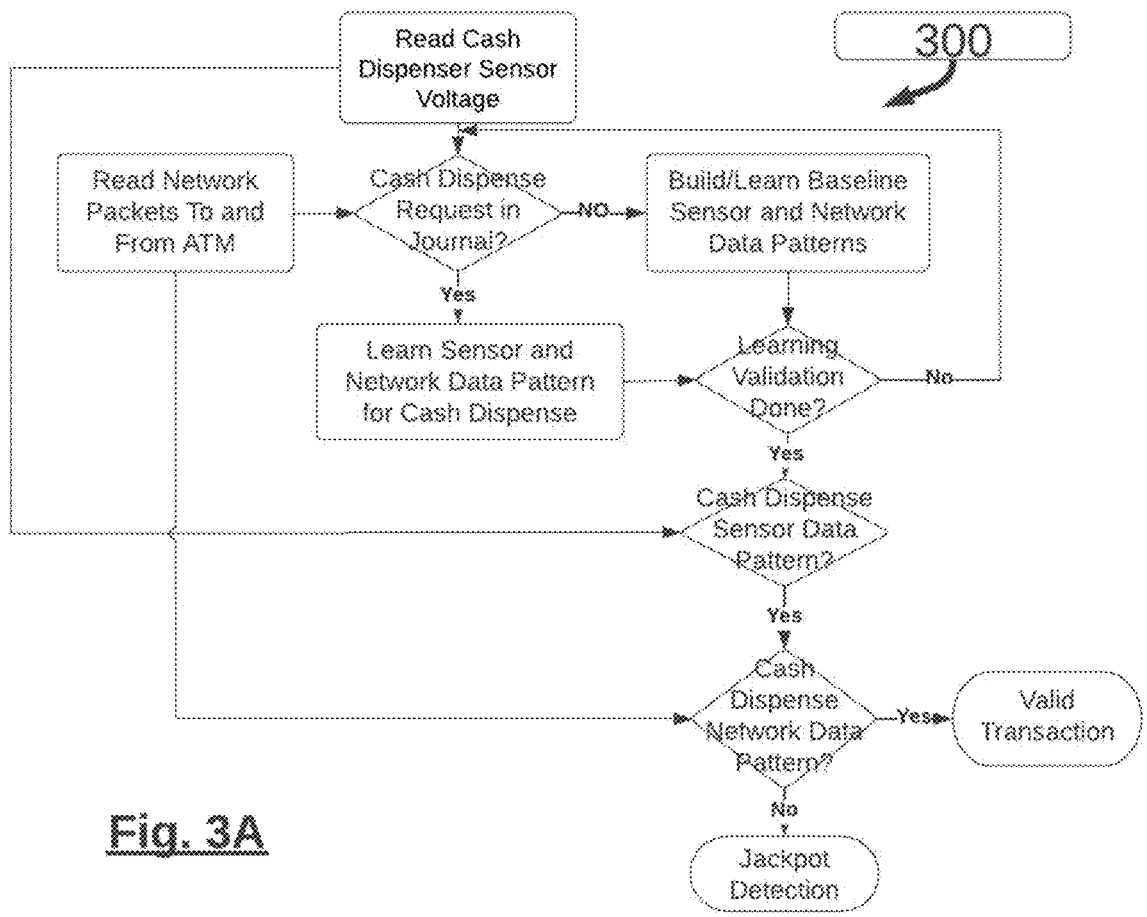
FIGS. 3A-3B illustrate block diagrams of methods in accordance with an embodiment of the inventive concepts.

Referring to FIG. 3A, an inventive concept includes a method 300 of detecting ATM fraud detection using the ATM fraud detection system 100, specifically it includes a method of detecting jackpotting. The method includes the steps of reading the voltage of the cash dispenser vibration sensor 4, reading the network packets to and from the ATM machine, comparing the readings from the cash dispenser vibration sensor 4 and the network packets against baseline data patterns, determining validity of a transaction, and determining a response based on validity of the transaction.

The step of determining validity of a transaction further includes the step of identifying a jackpotting fraud based on activation of the cash dispenser vibration sensor 4 without a pre-network data pattern for cash withdrawal authorization. The step of determining the validity of the transaction is performed in SentryWare 2.

The step of determining the response includes the steps of generating an alert or ticket in a third-party ticketing application. These alerts or tickets may be verified with data from imaging device 24 regarding ATM activity. Either through operator intervention or automatic triggers, SentryManager

201 may power down the cash dispenser and/or the ATM machine through a network switched PDU (power distribution unit) or release dye into the cash tray rendering the cash unusable, if fraudulent activity is detected.

Alternatively, the step of determining the response further includes the step of providing suggestions to the user by displaying one of the following messages: if the ATM fraud is jackpotting, then to display the message "Jackpotting at Location X!".

Figure 3B:
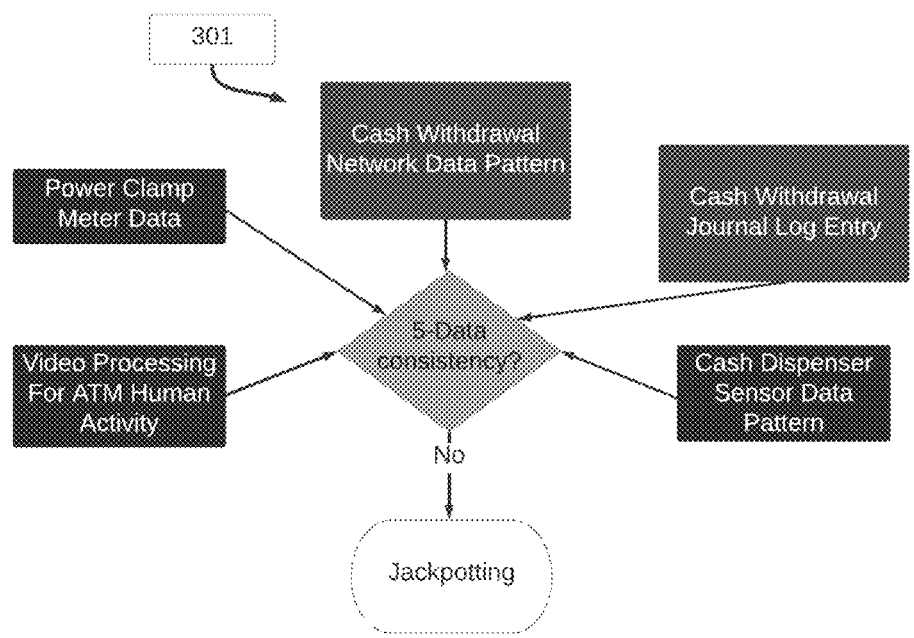

Referring to FIG. 3B, another inventive concept includes a method 301 of detecting jackpotting using the ATM fraud detection system 100 comprising the steps of reading the power clamp meter data, reading the cash withdrawal journal log entry, reading the cash dispenser vibration sensor 4 data pattern, reading the cash withdrawal network data pattern; processing the image device for human activity at the ATM machine; determining consistency in all of the data; and whether the transaction is a valid transaction or a jackpotting fraud. The step of determining the consistency in all of the data may be performed in SentryManager 201.

Figure 4A:
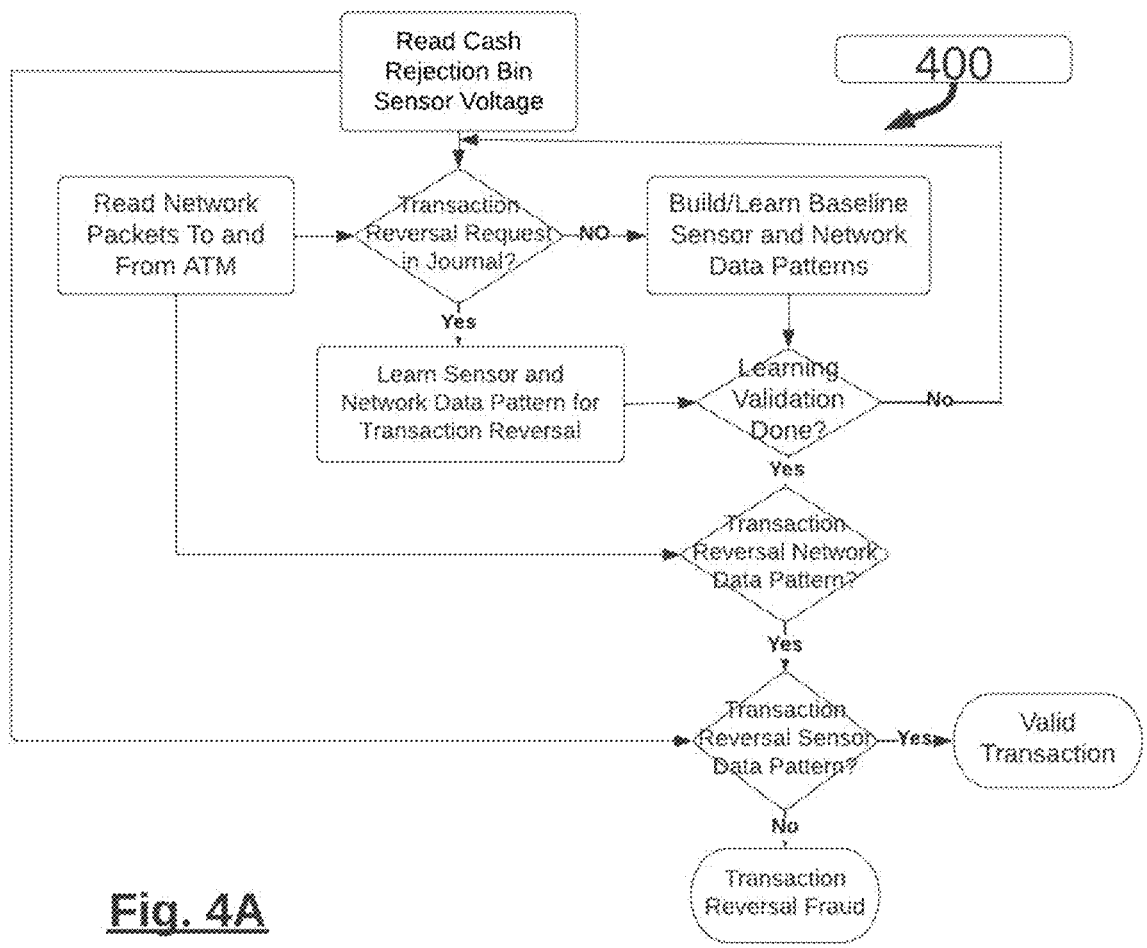
FIGS. 4A-4B illustrate block diagrams of methods in accordance with an embodiment of the inventive concepts.

Referring to FIG. 4A, an inventive concept includes a method 400 of detecting ATM fraud detection using the ATM fraud detection system 100, specifically it includes a method of detecting transaction reversal fraud. The method includes the steps of reading the voltage of the cash rejection bin vibration sensor 6, reading the network packets to and from the ATM machine, comparing the readings from the cash rejection bin vibration sensor 6 and the network packets against baseline data patterns, determining validity of a transaction, and determining a response based on validity of the transaction.

The step of determining validity of a transaction further includes the step of identifying a transaction reversal fraud based on identification of a transaction reversal request from network data pattern without a corresponding activation of the cash rejection bin vibration sensor 6. The step of determining the validity of the transaction may be performed in SentryWare 2 or SentryManager 201.

The step of determining the response includes the steps of generating an alert or ticket in a third-party ticketing application. These alerts or tickets may be verified with the data from imaging device 24 regarding ATM activity. Either through operator intervention or automatic triggers, SentryManager 201 may stop cash withdrawal activity at the ATM until the fraudster leaves the ATM which may be identified from the image device 24.

Figure 4B:
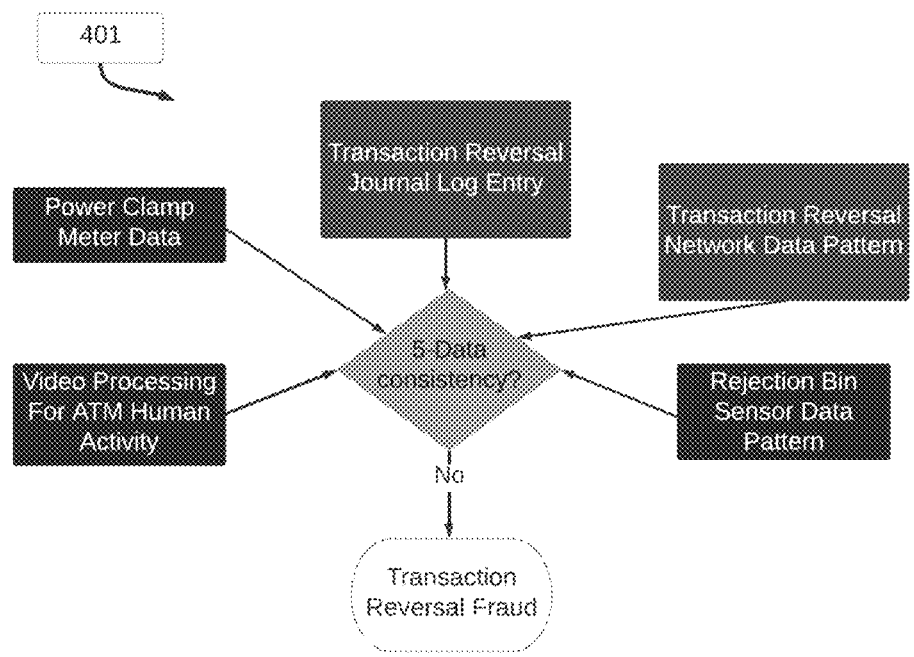

Referring to FIG. 4B, another inventive concept includes a method 401 of detecting transaction reversal using the ATM fraud detection system 100 comprising the steps of reading the power clamp meter data, reading the transaction reversal journal log entry, reading the cash rejection bin vibration sensor 6 data pattern, reading the transaction reversal network data pattern; processing the image device 24 for human activity at the ATM machine; determining consistency in all of the data; and whether the transaction is a valid transaction or a transaction reversal fraud. The step of determining the consistency in all of the data may be performed in SentryManager 201.

Figure 5A:
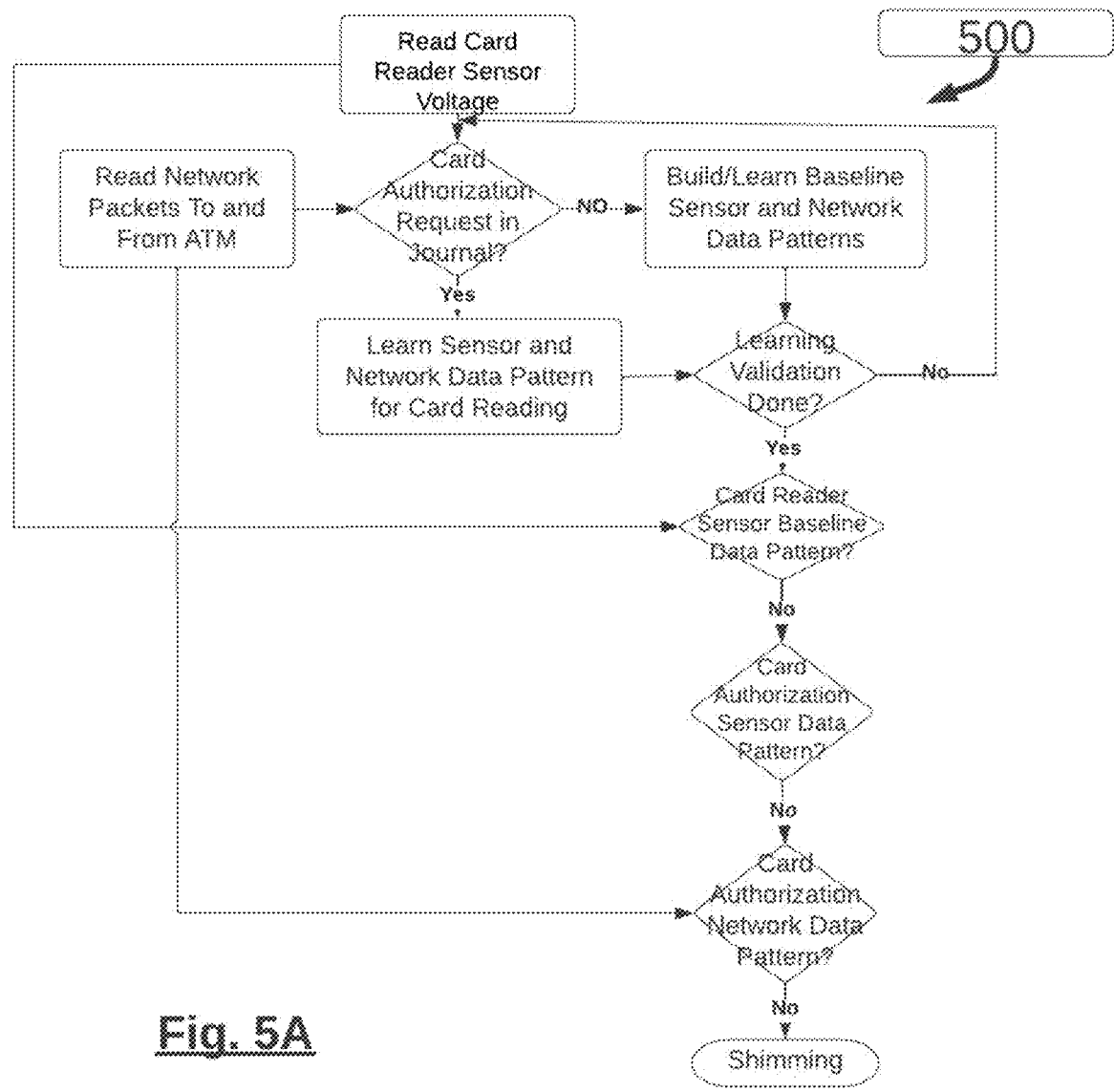
FIGS. 5A-5C illustrate block diagrams of methods in accordance with an embodiment of the inventive concepts.

Referring to FIG. 5A, an inventive concept includes a method 500 of detecting ATM fraud detection using the ATM fraud detection system 100, specifically it includes a method of detecting shimming. The method includes the steps of reading the voltage of the card reader vibration sensor 13, reading the network packets to and from the ATM machine, comparing the readings from the card reader vibration sensor 13, and the network packets against baseline data patterns, determining validity of a transaction, and determining a response based on validity of the transaction. The step of determining the validity of the transaction may be performed in SentryWare 2 or SentryManager 201.

The step of determining validity of a transaction further includes the step of identifying a shimming fraud based on activation of the card reader vibration sensor 13 without a network data pattern for card authorization/authentication.

The step of determining the response includes the steps of generating an alert or ticket in a third-party ticketing application. These alerts or tickets may be verified with the data from imaging device 24 regarding ATM activity. After shimming is verified from manual inspection of video data, service request to remove the shimming device is executed. Additionally, compromised ATM cards used during the presence of the shimming device are identified and cancelled, and new ATM cards are issued to the account holders of the compromised ATM cards.

Figure 5B:
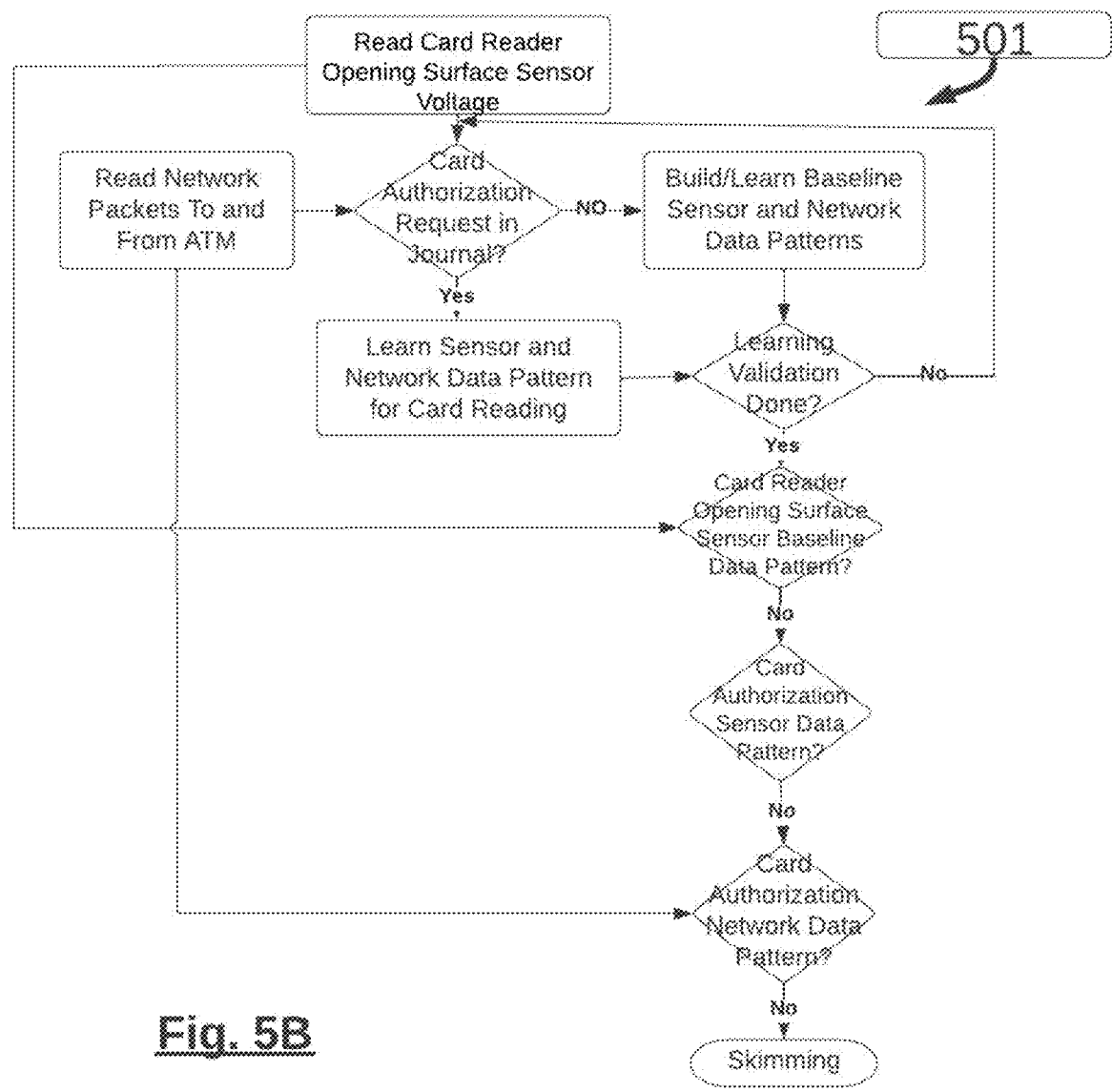

Referring to FIG. 5B, an inventive concept includes a method 501 of detecting ATM fraud detection using the ATM fraud detection system 100, specifically it includes a method of detecting skimming. The method includes the steps of reading the voltage of the card reader surface vibration sensor 14, reading the network packets to and from the ATM machine, comparing the readings from the card reader opening surface vibration sensor 14, and the network packets against baseline data patterns, determining validity of a transaction, and determining a response based on validity of the transaction. The step of determining the validity of the transaction may be performed in SentryWare 2 or SentryManager 201.

The step of determining validity of a transaction further includes the step of identifying a skimming fraud based on activation of the card reader opening surface vibration sensor 14 without a network data pattern for card authorization/authentication.

The step of determining the response includes the steps of generating an alert or ticket in a third-party ticketing application. These alerts or tickets may be verified with the data from imaging device 24 regarding ATM activity. After skimming is verified from manual inspection of video data, service request to remove the skimming device is executed. Additionally, compromised ATM cards used during the presence of the skimming device are identified and cancelled, and new ATM cards are issued to the account holders of the compromised ATM cards.

Figure 5C:
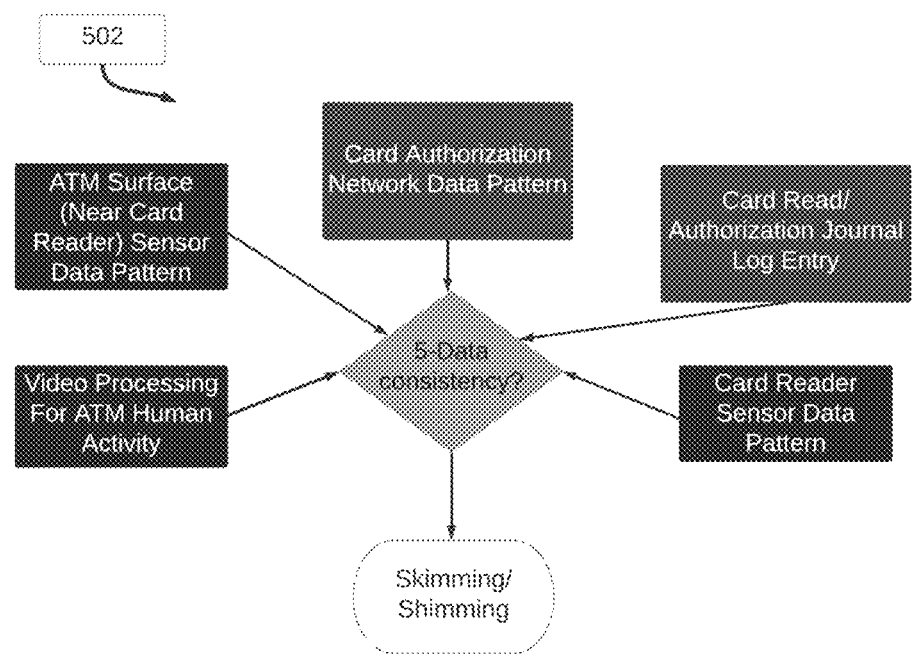

Referring to FIG. 5C, another inventive concept includes a method 503 of detecting skimming or shimming fraud using the ATM fraud detection system 100 comprising the steps of reading the ATM surface vibration sensor 14 data pattern, reading the card read/authorization journal log entry, reading the cash reader vibration sensor 13 data pattern, reading the card authorization network data pattern; processing the image device 24 data for human activity at the ATM machine; determining consistency in all of the data; and whether the transaction is a valid transaction or a skimming or shimming fraud has occurred. The step of determining the consistency in all of the data may be performed in SentryManager 201.

Figure 6:
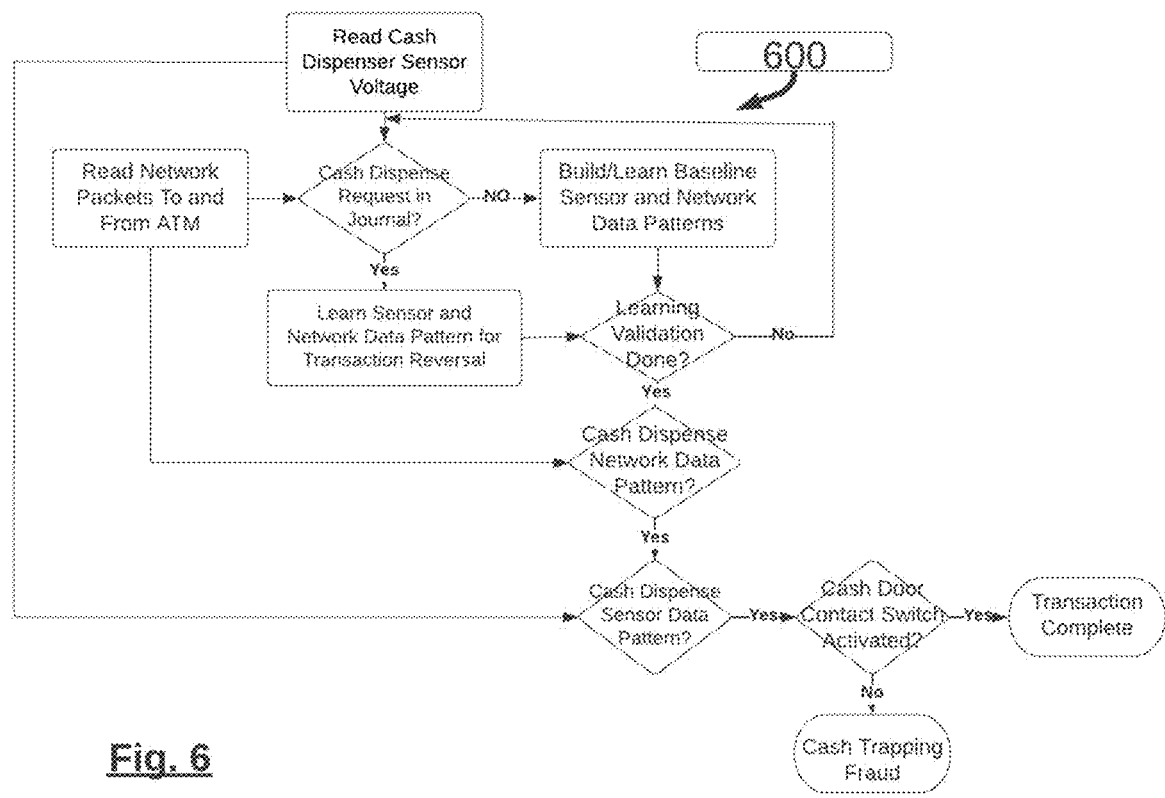
FIG. 6 illustrates a block diagram of a method in accordance with an embodiment of the inventive concepts.

Referring to FIG. 6, an inventive concept includes a method 600 of detecting ATM fraud detection using the ATM fraud detection system 100, specifically it includes a method of detecting cash trapping. The method includes the steps of reading the voltage of the cash dispenser vibration sensor 4, reading the network packets to and from the ATM machine, comparing the readings from the cash dispenser vibration sensor 4, cash door switch sensor 10 and the network packets against baseline data patterns, determining validity of a transaction reversal, and determining a response based on validity of the transaction reversal. The step of determining the validity of the transaction reversal may be performed in SentryWare 2 or SentryManager 201.

The step of determining validity of a transaction reversal further includes the step of identifying a cash trapping fraud based on activation of the cash dispenser vibration sensor 4 along with a network data pattern for cash dispensation without an activation of the cash door switch sensor 10.

The step of determining the response includes the steps of generating an alert or ticket in a third-party ticketing application. These alerts or tickets may be verified with the data from imaging device 24 regarding ATM activity. After cash trapping is verified from manual inspection of video data, service request to remove the cash trapping device is executed. Additionally, compromised users whose cash withdrawal was not executed due to the presence of the cash trapping device are refunded.

Figure 7:
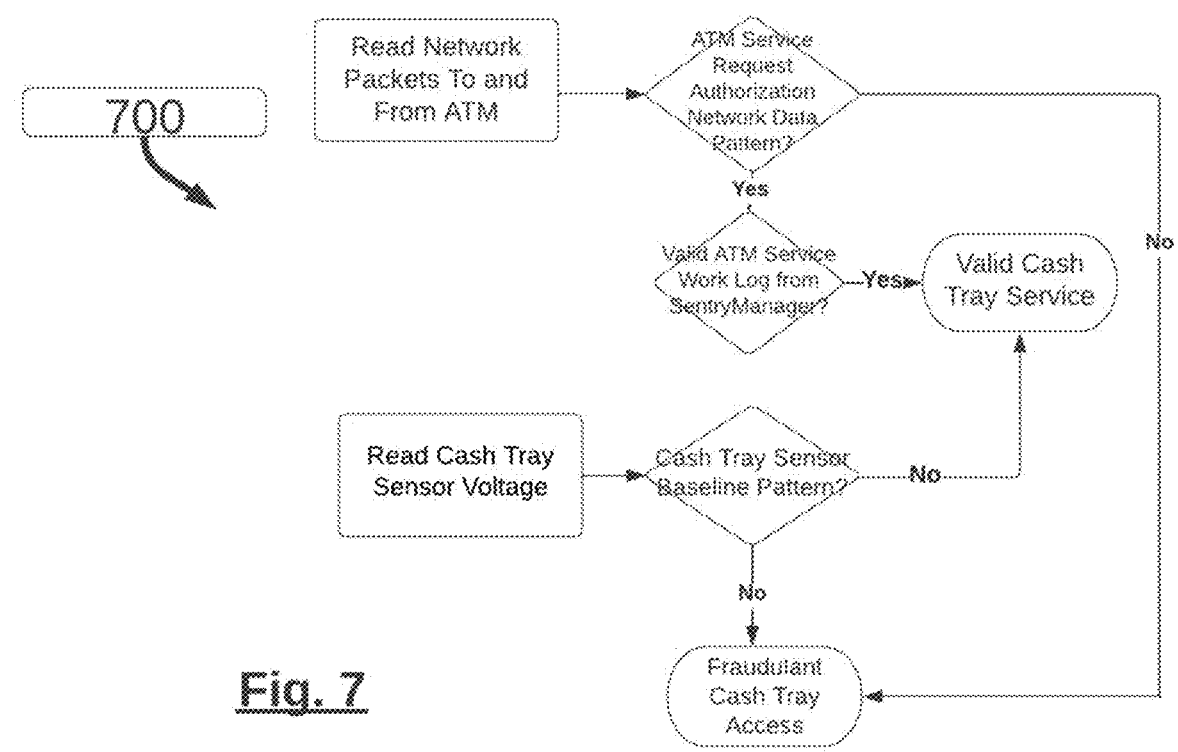
FIG. 7 illustrates a block diagram of a method in accordance with an embodiment of the inventive concepts.

Referring to FIG. 7, an inventive concept includes a method 700 of detecting ATM fraud detection using the ATM fraud detection system 100, specifically it includes a method of detecting internal theft. The method includes the steps of reading the voltage of the cash tray vibration sensor 8, verifying the ATM service request to reload cash tray from the ATM work/service log, comparing the readings from the cash tray vibration sensor 4 and the work/service log for the ATM machine, determining validity of an ATM activity, and determining a response based on validity of the ATM activity. The step of determining the validity of the ATM activity is performed in the SentryManager 201.

The step of determining validity of an ATM activity further includes the step of identifying an internal theft fraud based on activation of the cash tray vibration sensor 8 without a service request for a service member to access the ATM machine to load/unload the cash tray.

The step of determining the response includes the steps of generating an alert or ticket in a third-party ticketing application. These alerts or tickets may be verified with the data from imaging device 24 regarding ATM activity. The video data is shared with law enforcement or with the servicing company to terminate the service provider from servicing ATMs.

If the fraud is ATM theft, then to display the message "ATM Theft at Location X!" or to release dyes into the cash tray rendering the cash unusable. There may be certain warning signals prior to the ATM theft such as the presence of human(s) in the video data at odd hours, presence of a new wireless cell phone signal (detected by the wireless signal sensor) for longer than usual ATM transaction period, and triggering of ATM theft vibration sensor mounted on the ATM base/wall.

While the inventive concepts described herein with reference to illustrative embodiments for particular applications, it should be understood that the inventive concepts are not limited thereto. Those having ordinary skill in the art and access to the teachings provided herein will recognize additional modifications, applications, embodiments and substitution of equivalents all fall within the scope of the inventive concepts. Accordingly, the inventive concepts are not to be considered as limited by the foregoing description.

What is claimed as new and desired to be protected by Letters Patent of the United States is:

1. An Automated Teller Machine (ATM) fraud detection system, comprising:
   an ATM machine, the ATM machine having a cash tray, a cash rejection bin, a cash dispenser, a cash door, a card reader, an NFC card reader, an ATM computer, an ATM hub, an ATM hard disk drive, a keyboard, and a network cable;
   a plurality of vibration sensors and a plurality of switch sensors, a first one of the plurality of vibration sensors being arranged adjacent or in the vicinity of the cash tray, a second one of the plurality of vibration sensors being arranged adjacent or in the vicinity of the cash rejection bin, a third one of the plurality of vibration sensors being arranged adjacent or in the vicinity of the cash dispenser, a fourth one of the plurality of vibration sensors being arranged adjacent or in the vicinity of the card reader, and a fifth one of the plurality of vibration sensors being arranged adjacent or in the vicinity of surface of the card reader opening, and a first one of the plurality of switch sensors being arranged adjacent or in the vicinity of the cash door; and a power clamp meter configured to measure electrical power used by the cash dispenser,
   a micro controller, the microcontroller being communicatively linked to each of the plurality of vibration sensors, the plurality of switch sensors and the power clamp meter, the micro controller configured to receive data from the plurality of vibration sensors and the plurality of switch sensors,
   wherein the network cable communicatively links the ATM hub to the micro controller, and the micro controller configured to collect data on network packets that are sent or received by the ATM machine and wherein the microcontroller is further configured to compare readings from the plurality of vibration and switch sensors, the power clamp meter, and the network packets against baseline data patterns to determine validity of a transaction at the ATM.

2. The ATM fraud detection system of claim 1, wherein a second one of the plurality of switch sensors being arranged adjacent or in the vicinity of a hard disk drive of the ATM computer, a third one of the plurality of switch sensors being arranged adjacent or in the vicinity of a USB port to which the keyboard is connected, and a fourth one of the plurality of switch sensors being arranged adjacent or in the vicinity of the network cable terminals.

3. The ATM fraud detection system of claim 1, further comprising: the power clamp meter being wrapped around a power cable supplying power to the cash dispenser, and the power clamp meter configured to measure electrical power used by the cash dispenser,
   wherein the power clamp meter is communicatively linked to the micro controller, and the micro controller configured to receive data from the power clamp meter.

4. The ATM fraud detection system of claim 1, further comprising: an NFC card reader sensor, the NFC card reader sensor being arranged adjacent or in the vicinity of the NFC card reader,
   wherein the NFC card reader sensor is communicatively linked to the micro controller, and the micro controller configured to receive data from the NFC card reader sensor.

5. The ATM fraud detection system of claim 2, wherein the microcontroller includes one or more processing devices and associated processing circuitry, and
   wherein the microcontroller is configured to analyze data from the plurality of vibration and switch sensors to identify an ATM activity.

6. The ATM fraud detection system of claim 2, further comprising: wireless signal detectors to detect persistent presence of wireless cameras or presence of spying or hacking wireless devices near the ATM machine.

7. A method of detecting Automated Teller Machine (ATM) fraud, comprising:
providing an ATM fraud detection system including an ATM machine having a plurality of vibration sensors comprising at least five vibration sensors correspondingly arranged adjacent or in the vicinity of a cash tray, cash rejection bin, cash dispenser, card reader, and card reader opening of the ATM, a plurality of switch sensors comprising at least one of the plurality of switch sensors arranged adjacent or in the vicinity of a cash door of the ATM, and a power clamp meter configured to measure electrical power used by the cash dispenser; and a micro controller communicatively linked to the plurality of vibration and switch sensors, and the power clamp meter;
receiving, by the micro controller, voltages from the plurality of vibration and switch sensors and electric power from the power clamp meter;
receiving, by the micro controller, network packets to and from the ATM machine;
comparing readings from the plurality of vibration and switch sensors, power clamp meter, and the network packets against baseline data patterns;
determining validity of a transaction at the ATM machine based on the comparing; and
determining a response based on validity of the transaction.

8. The method of claim 7, wherein the step of determining said validity further includes the step of: identifying a jackpotting fraud based on activation of a first one of the plurality of vibration sensors mounted on or adjacent to a cash dispenser of the ATM machine without a pre-network data pattern for cash withdrawal authorization.

9. The method of claim 7, wherein the step of determining said response further includes the step of: providing alert messages or generating a ticket in a third-party ticketing application.

10. The method of claim 7, wherein the step of determining said validity further includes the step of: identifying a transaction reversal fraud based on identification of a transaction reversal request from network data pattern without a corresponding activation of a second one of the plurality of vibration sensors mounted on or adjacent to a cash rejection bin of the ATM machine.

11. The method of claim 7, wherein the step of determining said validity further includes the step of: identifying a shimming fraud based on activation of a third one of the plurality of vibration sensors mounted on or adjacent to a card reader of the ATM machine without a network data pattern for card authorization/authentication.

12. The method of claim 7, wherein the step of determining said validity further includes the step of: identifying a skimming fraud based on activation of a fourth one of the plurality of vibration sensors arranged adjacent to a card reader opening of the ATM machine without a network data pattern for card authorization/authentication.

13. The method of claim 7, wherein the step of determining said validity further includes the step of: identifying a cash trapping fraud based on activation a first one of the plurality of vibration sensors mounted on or adjacent to a cash dispenser of the ATM machine along with a network data pattern for cash dispensation without an activation of a first one the plurality of switch sensors mounted on or adjacent to a cash door of the ATM machine.

14. The method of claim 7, wherein the step of determining said validity further includes the step of: identifying an internal theft fraud based on activation of a fifth one of the plurality of vibration sensors mounted on or adjacent to a cash tray of the ATM machine without a service request for a service member to access the ATM machine to load/unload a cash tray of the ATM machine.

15. A computerized system for detecting ATM fraud, comprising:
a plurality of ATM fraud detection systems and a plurality of image devices, the ATM fraud detection systems and the image devices communicatively linked to an application hosted on Internet cloud,
each of the plurality of ATM fraud detection systems further comprising:
an ATM machine having a plurality of vibration sensors comprising at least five vibration sensors correspondingly arranged adjacent or in the vicinity of a cash tray, cash rejection bin, cash dispenser, card reader, and card reader opening of the ATM, a plurality of switch sensors comprising at least one of the plurality of switch sensors arranged adjacent or in the vicinity of a cash door of the ATM, and a power clamp meter configured to measure electrical power used by the cash dispenser; and a micro controller communicatively linked to the plurality of vibration and switch sensors, and the power clamp meter, the micro controller configured to receive data from the plurality of vibration and switch sensors, and the power clamp meter, and the micro controller configured to collect data on network packets that are sent or received by the ATM machine,
wherein the application is configured to use a machine learning model to detect ATM frauds by comparing the received and collected data against baseline data patterns.

* * * * *